United States Patent [19]

Nagano

[11] Patent Number: 4,573,951
[45] Date of Patent: Mar. 4, 1986

[54] DERAILLEUR FOR A BICYCLE
[75] Inventor: Masashi Nagano, Izumi, Japan
[73] Assignee: Shimano Industrial Company Limited, Osaka, Japan
[21] Appl. No.: 592,787
[22] Filed: Mar. 23, 1984
[30] Foreign Application Priority Data Mar. 30, 1983 [JP] Japan .............................. 58-47183[U]

[51] Int. Cl.$^4$ .............................................. F16H 9/00
[52] U.S. Cl. .......................................... 474/82; 474/80
[58] Field of Search ..................................... 474/80, 82
[56] References Cited

U.S. PATENT DOCUMENTS

| | | | |
|---|---|---|---|
| 3,979,962 | 9/1976 | Kebsch | 474/82 |
| 4,027,542 | 6/1977 | Nagano | 474/82 |
| 4,406,643 | 9/1983 | Shimano | 474/80 X |
| 4,469,479 | 9/1984 | Ozaki | 474/80 |

Primary Examiner—James A. Leppink
Assistant Examiner—Frank McKenzie
Attorney, Agent, or Firm—Stevens, Davis, Miller & Mosher

[57] ABSTRACT

A derailleur for a bicycle, which is provided with a linkage mechanism comprising a base member, a pair of linkage members and a movable member having a chain guide, in which one of the four members constituting the linkage mechanism is provided with a mounting base entering into a space in the linkage mechanism. A tightening member having at the upper end thereof a control, is mounted to the base in the relation that the tightening member extends lengthwise vertically, so that a jig inserted into the space tightens the tightening member to thereby tightly grip the control wire.

5 Claims, 8 Drawing Figures

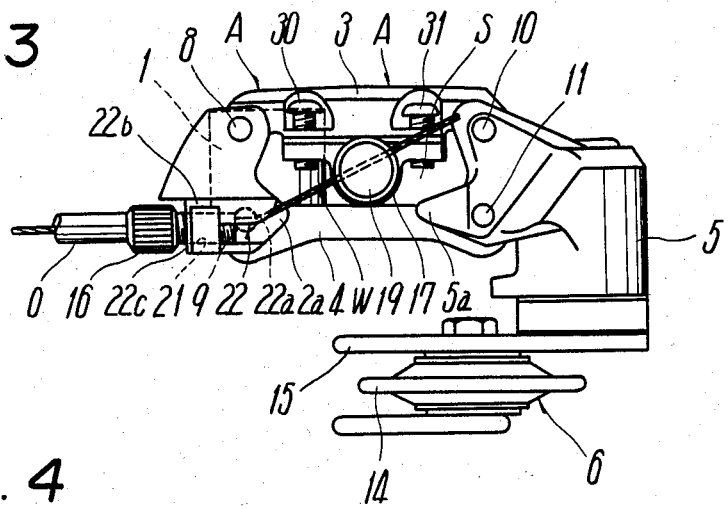
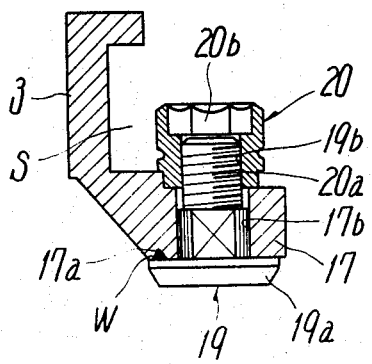
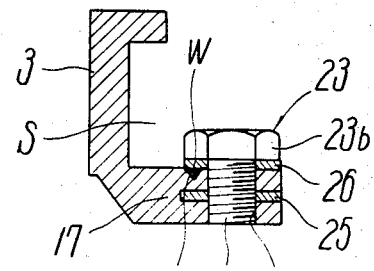
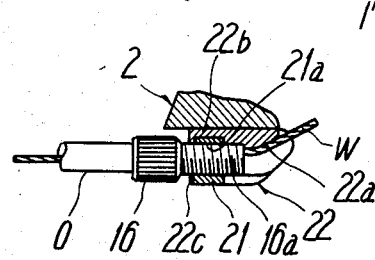
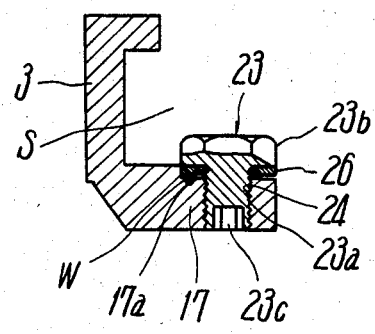
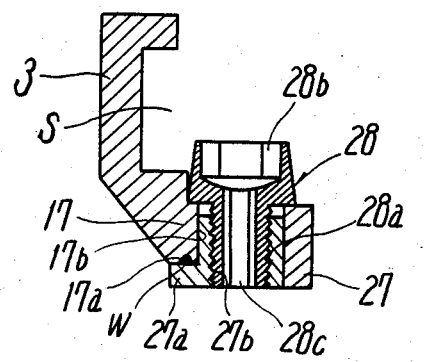

DERAILLEUR FOR A BICYCLE

FIELD OF THE INVENTION

This invention relates to a derailleur for a bicycle, and more particularly to a derailleur for a bicycle provided with a linkage mechanism which is transformed by a control wire to move a chain guide provided at a movable member at the linkage mechanism so that a driving chain is shifted to a desired one sprocket at a multistage sprocket assembly mounted to the bicycle, thereby changing the bicycle speed.

BACKGROUND OF THE INVENTION

Conventionally, a derailleur for the bicycle is often provided with a linkage mechanism comprising four members: a base member, a pair of linkage members pivoted thereto through a pair of connecting shafts, and a movable member pivoted to the linkage members through a pair of connecting shafts and having a chain guide, so that a control wire is operated to transform the linkage mechanism, thereby moving the movable member with respect to the base member.

This derailleur is provided with a wire fixture for fixing one end of the control wire, the fixture mainly using a connecting shaft for connecting the movable member to the linkage members, mounted at the lower surface of the movable member, and projecting downwardly therefrom. Incidentally, there are some derailleurs which provide the wire fixture at an intermediate portion of one linkage member, in which the fixture also projects downwardly from the lower surface of linkage member. In addition, the above terms "the lower surface and downwardly" are used with respect to the mounting condition of the derailleur to the bicycle, which is the same in the following description.

The wire fixture comprises a wire hold base and a tightening screw screwable therewith so that the control wire is secured at one end between the base and the head of the screw.

The control wire is supported at one end to an operating lever through a retainer and secured at the other end to the derailleur when mounted to the bicycle frame.

The wire fixture as abovementioned is mounted to the lower surface of the movable member or linkage member and the tightening screw screws with the holding base from below. Hence, in a case where the control wire is to be secured to the wire fixture, or the wire length is adjusted, the screw is operated at the lower surface of the derailleur, so that the fixing or length adjustment of the wire, is not easy to carry out.

Also, the wire fixture, which largely projects downwardly from the derailleur, is liable to hit a foreign object, thereby creating the problem in that the wire fixture, and in turn the derailleur, is subjected to a large impact so as to be breakable and also has a poor external appearance.

Furthermore, a wire fixture has been proposed which is mounted inside the movable member not to project to the exterior. In this case, however, a window through which a jig operates the wire fixture, is required to be formed at the outer linkage member, thereby also creating the problem in that the outer linkage member has a lowered strength and the derailleur has a very poor appearance.

SUMMARY OF THE INVENTION

Paying attention to the fact that the derailleur provided with the linkage mechanism possesses a space surrounded by the base member, pair of linkage members and movable member constituting the linkage mechanism, this invention has been designed. An object of the invention is to provide a derailleur which utilizes the space for making the wire fixture operable from above of the derailleur when mounted on the bicycle frame to thereby facilitate the fixing of the control wire and adjustment of the length thereof, restricts the wire fixture from largely projecting outwardly from the derailleur, requires no window at any member in order to insert the jig, gives the derailleur good appearance, and prevents deterioration in its strength.

The derailleur of the invention, which is provided with a linkage mechanism comprising four members of a base member, a pair of linkage members pivoted thereto through a pair of connecting shafts, and a movable member having a chain guide and pivoted to the linkage members through a pair of connecting shafts so that the control wire is operated to transform the linkage mechanism to thereby move the movable member with respect to the base memebr, is provided at one of the four members with a mounting base projecting into a space within the linkage mechanism, to which mounting base is mounted a tightening member having at one end a control and directed in parallel to the connecting shafts, thereby enabling the operation of the tightening member from above the linkage mechanism.

The mounting base is provided mainly at one linkage member so as to enter into the space on a plane between the one linkage member and the other, and may alternatively be provided at the movable member or base member.

The tightening member is composed mainly of a male screw member and a female screw member, and the control of the same is disposed in a stereoscopic space in the linkage mechanism, so that a given jig is inserted into the linkage mechanism from above through the space.

Thus, this invention makes it possible to operate the control from above in condition of mounting the derailleur on the bicycle frame, thereby fixing the control wire to the wire fixture, or adjusting a length of the control wire. Also, the wire fixture, which projects outwardly to a minimum, solves the problem of a breakdown of the same.

Furthermore, there is no need of providing a window for insersion of a jig because the wire fixture is operated by use of the space and the control wire extends along outside the derailleur, whereby the linkage mechanism has a sufficient strength and a good appearance.

These and other objects of the invention will become more apparent in the detailed description and examples which follow.

BRIEF DESCRIPTION OF THE DRAWINGS

FIG. 3 is a bottom view thereof,

FIG. 4 is a longitudinal sectional view of a principal portion of the same,

FIG. 5 is a sectional view of a supporting portion for an outer sheath holder, and FIGS. 6 through 8 are views explanatory of the principal portions only of other modified embodiments of the invention.

DETAILED DESCRIPTION OF THE INVENTION

Figure 1:
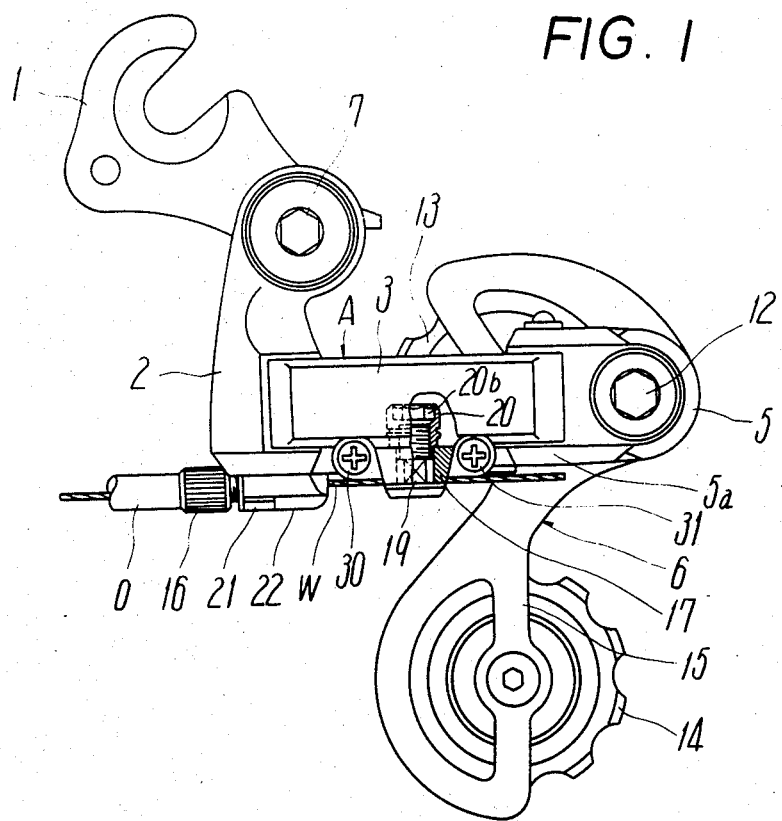
FIG. 1 is a front view of an embodiment of a derailleur of the invention.
Figure 2:
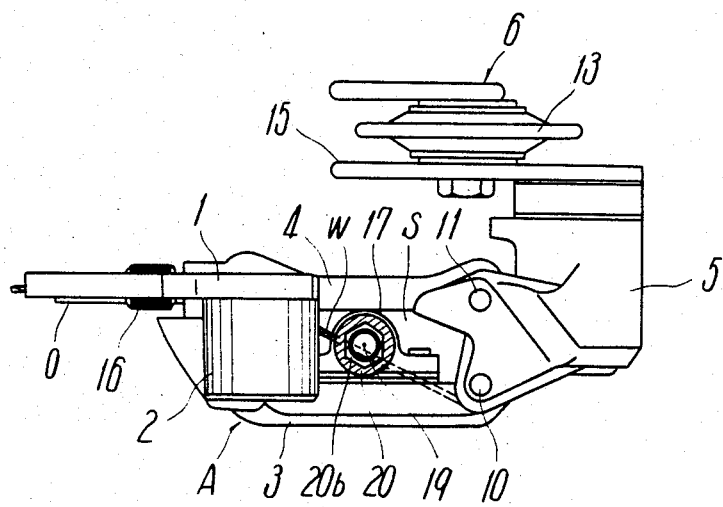
FIG. 2 is a plan view of the FIG. 1 embodiment.

Referring to FIGS. 1 through 3, a typical embodiment of a rear derailleur mounted to the rear wheel of the bicycle is shown, which basically comprises a fixing member 1 fixed to the bicycle frame and a linkage mechanism A pivoted to the fixing member 1.

The linkage mechanism A comprises four members, namely, base member 2 pivoted to the fixing member 1 through a horizontal shaft 7, a pair of linkage members 3 and 4 opposite to each other and supported to the base member 2, and a movable member 5 supported to the linkage members 3 and 4 and having a chain guide 6.

The base member 2 is provided at one side with a pair of mounting noses, to which the linkage members 3 and 4 are pivoted through a pair of connecting shafts 8 and 9, the linkage members 3 and 4 pivotally supporting at the free ends thereof the movable member 5 through a pair of connecting shafts 10 and 11.

The movable member 5 is alike in shape to the base member 2 and provided at one side with opposite mounting noses and pivoted swingably to the linkage members 3 and 4 through the shafts 10 and 11 mounted to the opposite noses. Also, the movable member 5 carries at the other end the chain guide 6 having a guide pulley 13 and a tension pulley 14, in relation of being rotatable only in the predetermined range through a horizontal shaft 12 parallel to the horizontal shaft 7. The linkage members 3 and 4 swing to move the movable member 5 in a parallelogrammic manner with respect to the base member 2 from the high speed stage shown in FIG. 1 to the low speed stage.

The chain guide 6 comprises the guide pulley 13, tension pulley 14 and change-over frame 15. The change-over frame 15 is supported rotatably to the movable member 5 through the horizontal shaft 12.

The derailleur constructed as foregoing is provided with a return spring ( not shown ) between the linkage member 3 or 4 and the movable member 5 or base member 2 so that the movable member 5 is biased axially of the multistage sprocket assembly, that is, toward the top or low stage, normally toward the top stage. At one of two members of linkage mechanism A in movement relative to each other is provided a wire fixing means to be discussed below for securing one end of control wire W, and at the other member a support for a holder 16 for supporting an outer sheath O guiding the control wire W. The control wire W is pulled to swing the linkage members 3 and 4 against the return spring to move the movable member 5 forwardly, and is released to swing the same, thereby moving the movable member 5 backwardly. Thus, the movable member 5 reciprocates to switch to one sprocket the driving chain carried on the guide and tension pulleys 13 and 14.

Next, explanation will be given on the wire securing means of the important component of the invention.

The securing means is formed basically by use of a space S surrounded by the members 2 through 5 at the linkage mechanism A. A mounting base 17 for the wire W is provided at one of base memebr 2, linkage members 3 and 4, and movable member 5 so as to enter the space S, and at the entering portion into the space S with a wire receiving portion 17a and a through bore 17b extending in parallel to the connecting shafts 8 through 11. Also, tightening members 19 and 20 are fitted into the through bore 17b axially vertically thereof and tightly grip the wire W with the receiving segment 17a at the holder base 17. At the upper end of tightening member 19 or 20 is provided a control 20b operable from above of the linkage mechanism, the control 20b being operated to secure the wire W to the wire mounting base 17.

In FIGS. 1 through 4, at one linkage member 3 is provided the base 17 integral therewith, the base 17 entering into the space S and having the not-round through bore 17b, the tightening member comprising a male screw member 19 having a head 19a and supported not-rotatably and axially movably only to the through bore 17b and a female screw member 20 having a threaded bore 20a screwable with a screw thread 19b at the screw member 19 and a control 20b. Both the screw members 19 and 20 sandwich therebetween the base 17, and the wire W is tightly gripped between the head 19a of screw member 19 and the wire receiving portion 17a of base 17.

In such a construction, since the female screw member 20 is disposed inside the space S, the wire fixture projects to the exterior to a minimum except for the projection of male screw member 19 from the lower surface of base 17. Also, the control 20b is positioned in the space S and operable from above of the linkage mechanism A.

Also, since the male screw member 19 is fitted notrotatably into the through bore 17b, the female screw member 20 further is readily controllable.

The control 20b at the female screw member 20, as shown in FIGS. 2 and 4, is formed of a hexagonal bore, which may alternatively be not-round at the outer periphery, or may form at the end face a groove for a screw driver. In addition, the female screw member 20, when rotated for securing the wire W, is brought at the end face into contact with the inner surface of base 17, thereby being restricted in axial movement.

The control wire W is secured to the derailleur on the bicycle frame in such a manner that a jig is inserted into the space S from above of the linkage mechanism A and fitted into the control 20b, the female screw member 20 at first is screwed backwardly to form a gap between the lower surface of base 17 and the head 19a of male screw member 19, the terminal of control wire W is fitted into the gap, and then the female screw member 20 is screwed forwardly, thereby tightly gripping the terminal of wire W between the head 19a and the base 17.

Thus, the rotatable control of female screw member 20 from above of the derailleur facilitates the fixing and removal of control wire W, and the female screw member 20 covered by the linkage member 3 is prevented from projecting outwardly.

In the derailleur shown in the drawing, the base member 2 is provided with a support 21 having a support bore 21a extending in the same direction as the linkage member 4, the outer sheath holder 16 screws with the support bore 21a, and a wire guide 22 of synthetic resin having a guide groove 22a at the wire exit side of support bore 21a is mounted to the support 21, so that even when the fixed end of wire W repeatedly reciprocates by the transformation of linkage mechanism, the wire W is prevented from being cut at the exit of outer sheath holder 16. Also, the wire guide 22 is provided at one end with a lock ring 22c through a bridge 22b, the screw thread 16a at the outer sheath holder 16 screwing with the center bore of lock ring 22c, thereby preventing the outer sheath holder 16 from being loose.

The linkage mechanism A is provided with a restriction means comprising a pair of adjusting screws 30 and 31 for adjusting a movement range of movable member 5 and a pair of stoppers 2a and 5a abut against the screws 30 and 31 respectively to restrict the movable member 5 in its movement.

Also, the base 17 is provided with supports for the adjusting screws 30 and 31, the stoppers 2a and 5a being provided at the lower surfaces of base member 2 and movable member 5 respectively.

Alternatively, the wire fixture, as shown in FIGS. 6 and 7, may use one headed screw member 23 having a screw thread 23a at the outer periphery. In FIG. 6, the base 17 has a threaded through-bore 24 with which the screw member 23 is screwed to secure the terminal of wire W between the upper surface of base 17 and the head of screw member 23, the screw member 23 having a hexagonal control 23b at the head. In addition, reference numeral 25 designates a lock plate of synthetic resin, embedded in the base 17 to prevent looseness of screw member 23, and 26 designates a washer. In the construction in FIG. 6, an auxiliary control 23c may be provided at the utmost end of screw member 23a as shown in FIG. 7.

Alternatively, a female screw member 27, as shown in FIG. 8, may be fitted not-rotatably into the not-round through bore 17b and have a head 27a so that the wire W is secured between the lower surface of base 17 and the head 27a, and be provided at the center with a threaded bore 27b so that a male screw member 28 screws at its threaded stem 28a with the threaded bore 27b.

In this case, a control 28b is formed at the head of male screw member 28 and also the threaded stem 28a can provide a control 28c, in which the controls 28b and 28c are changeable in the size and formation to be controllable by use of different jigs.

Alternatively, the base 17 may be provided at the base member 2, linkage member 4 or movable member 5.

As seen from the above, the derailleur of the invention constructed as abovementioned has the tightening member directed upwardly of the same so that the tightening member is operable from above utilizing the space in the linkage mechanism, thereby facilitating the fixing and removal of wire, preventing each component at the linkage mechanism from being hit by foreign objects, and giving the derailleur a good appearance.

Furthermore, there is no need of providing the particular window for the use of jigs, thereby eliminating deterioration in strength and keeping a further good appearance.

Although several embodiments have been described, they are merely exemplary of the invention and not to be constructed as limiting, the invention being defined solely by the appended claims.

What is claimed is:

1. A derailleur for a bicycle comprising a four member linkage mechanism which is transformable and has a base member, a pair of linkage members, a movable member having a chain guide, and four connecting shafts for connecting said four members; a mounting base for a control wire which is fixed to one of said four members of said linkage mechanism, said mounting base entering into a space surrounded by said four members of said linkage mechanism, an entering portion of said base having a receiving portion for said control wire and a through bore extending in the same direction as said connecting shafts; and, at least one tightening member fitted into said through bore at said base to fixedly press a control wire onto said wire receiving portion at said base, said tightening member extending in the same direction as said connecting shafts and having at, at least one lengthwise end, a control portion operable from above said linkage mechanism when said derailleur is mounted on a bicycle.

2. A derailleur for a bicycle according to claim 1, wherein said mounting base is fixed to one of said four linkage members and enters into said space formed between said four members, said receiving portion at said base being positioned outwardly from said one linkage member.

3. A derailleur for a bicycle according to claim 2, wherein said control portion at said tightening member screwable with said base is disposed inside said one linkage member.

4. A derailleur for a bicycle according to claim 2, wherein said base member is provided with a support portion for an outer sheath holder which supports one end of an outer sheath for guiding said control wire and a wire guide having a guide groove for guiding said control wire to said base.

5. a derailleur for a bicycle according to claim 1, wherein a restriction means having a pair of adjusting screws for adjusting a range of movement of said movable member is provided, said base being fixed to one of said linkage members and provided with support portions for supporting said adjusting screws at said restriction means.

* * * * *